(12) United States Patent
Uchida et al.

(10) Patent No.: US 6,592,957 B2
(45) Date of Patent: Jul. 15, 2003

(54) HOSE FOR AUTOMOBILE COOLING SYSTEM

(75) Inventors: Kensuke Uchida, Kawasaki (JP); Toshiro Ijima, Wako (JP)

(73) Assignees: Asahi Kasei Kabushiki Kaisha, Osaka (JP); Honda Giken Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 09/820,994

(22) Filed: Mar. 30, 2001

(65) Prior Publication Data

US 2001/0055659 A1 Dec. 27, 2001

(30) Foreign Application Priority Data

Mar. 31, 2000 (JP) ........................................ 2000-096042

(51) Int. Cl.$^7$ ........................... B32B 27/08; B32B 27/32
(52) U.S. Cl. ................ 428/36.8; 428/36.91; 428/475.8; 428/476.1
(58) Field of Search ................................. 428/35.7, 36.6, 428/36.7, 475.8, 476.1, 36.8, 36.91, 475.1, 516, 523

(56) References Cited

U.S. PATENT DOCUMENTS

| 5,792,532 A | 8/1998 | Pfleger | 428/36.9 |
| 6,177,516 B1 * | 1/2001 | Hudak | 525/7 |
| 6,495,249 B2 * | 12/2002 | Uchida et al. | 428/319.3 |

FOREIGN PATENT DOCUMENTS

| DE | 4000434 C1 | 4/1991 |
| DE | 4432584 C1 | 2/1996 |
| JP | 4290691 | 10/1992 |
| JP | 214647 | 8/1995 |
| JP | 8100873 | 4/1996 |
| JP | 200072885 A | 3/2000 |

* cited by examiner

Primary Examiner—Sandra M. Nolan
(74) Attorney, Agent, or Firm—Birch, Stewart, Kolasch & Birch, LLP

(57) ABSTRACT

The present invention relates to a multi-layer hose for automobile cooling systems which comprises at least two layers of inner layer and outer layer wherein:

(1) the material for inner layer is a composition which contains a polymer containing a carboxyl group and/or its derivative group in the molecule and a dynamically crosslinked olefin thermoplastic elastomer, the content of the polymer containing a carboxyl group and/or its derivative group thereof in the molecule being 5–50% by weight based on the total weight of the composition and (2) the material for outer layer comprises a polyamide thermoplastic resin.

20 Claims, No Drawings

HOSE FOR AUTOMOBILE COOLING SYSTEM

BACKGROUND OF THE INVENTION

The present invention relates to piping parts for an automobile cooling system, which are made of novel materials. More particularly, it relates to a multi-layer hose for an automobile cooling system, which is made of thermoplastic materials and is light in weight, flexible and excellent in endurance.

The piping parts for automobile cooling system, such as radiator hoses, cooling pipes and heater pipes, have hitherto been made using metals or crosslinked rubbers, and demands for weight saving, flexibilization and improvement of moldability have been increased, and improvement in materials is desired.

Hoses made of thermoplastic resins or thermoplastic elastomers are expected as meeting the above demands. However, it is necessary that the hoses be excellent in oil resistance, heat resistance and water resistance, and it is difficult to meet all of the above demands with hoses composed of one material such as olefin resins, styrene resins or polyamide resins. Thus, development of hoses made of a plurality of the materials in combination has been attempted.

Recently, olefin thermoplastic elastomers are used in a wide variety of fields as substitutes for crosslinked rubbers since they have water resistance, are high in flexibility, can be subjected to various molding processing and can be recycled.

Among them, so-called dynamically crosslinked thermoplastic elastomers obtained by crosslinking an olefin elastomer having radical-crosslinkability and a thermoplastic resin having no radical-crosslinkability such as polypropylene in the presence of a crosslinking agent under melt-kneading in a kneading machine are now being used for applications such as automobile parts and others because they can be markedly improved in heat resistance, oil resistance, permanent compression set and others by crosslinking the elastomer component.

On the other hand, JP-A-4-290691 and JP-A-8-100873 disclose multi-layer hoses composed of an inner layer comprising a polyolefin and an outer layer comprising a polyamide, but these are insufficient in flexibility and still have room for improvement in endurance.

SUMMARY OF THE INVENTION

Under the circumstances, the object of the present invention is to provide a multi-layer hose for automobile cooling systems which is light in weight, flexible and, besides, excellent in endurance.

Here, the piping parts for automobile cooling systems in the present invention mean piping hoses used for circulating engine cooling water, and an anti-freeze of high temperature is circulated therethrough.

That is, the inner layer of these hoses directly contacts with an aqueous anti-freeze, and, hence, is required to have hydrolytic resistance, heat resistance, water vapor permeation resistance, and the like. On the other hand, the outer layer of the hoses is required to have oil resistance, heat resistance, and the like. In order to meet the different requirements of the inner and outer layers, it is effective to use multi-layer hoses whose inner layer and outer layer are made of different materials, respectively. Specifically, olefin materials are most suitable for the inner layer and polyamide materials are most suitable for the outer layer. Furthermore, when the inner layer and the outer layer of hoses are made of different materials, the material of the inner layer and the material of the outer layer must closely adhere to each other at their interface. Moreover, the piping hoses for automobile cooling systems, per se, which comprise the material for the outer layer and the material for the inner layer must be flexible to satisfy piping performance and be able to withstand vibrations.

The inventors have found that the above object can be attained by using a composition comprising a polymer having a specific polar group and a thermoplastic elastomer as essential components and by molding the composition to a specific multi-layer structure. That is, the multi-layer hose for automobile cooling systems of the present invention has been accomplished by using suitable materials which comprise a thermoplastic elastomer as the material for the inner layer and a polyamide thermoplastic resin as the material for the outer layer flexibility to the hose, per se, and furthermore impart to the thermoplastic elastomer a strong adhesive property to bind the materials for the inner and outer layers.

That is, the present invention relates to a multi-layer hose for automobile cooling systems comprising at least two layers of inner layer and outer layer wherein:

(1) the material for inner layer comprises a composition which contains a polymer having a carboxyl group and/or its derivative group in the molecule and a thermoplastic elastomer, the content of the polymer having a carboxyl group and/or its derivative group in the molecule being 5–50% by weight based on the total weight of the composition, and (2) the material for outer layer comprises a polyamide thermoplastic resin,
said thermoplastic elastomer being a dynamically crosslinked olefin thermoplastic elastomer which comprises (A) 10–90 parts by weight of an ethylene-α-olefin copolymer comprising ethylene and an α-olefin of 3–12 carbon atoms produced using a metallocene catalyst and (B) 90–10 parts by weight of a propylene resin [total amount of (A) and (B) being 100 parts by weight].

DETAILED DESCRIPTION OF THE INVENTION

The present invention will be explained in detail below.

In the present invention, the multi-layer hose basically has a structure of the inner layer and the outer layer as adhered together side by side, but the multi-layer hose may have such a structure that an intermediate layer, which has adhesion to both of the inner layer and the outer layer, is put between the inner layer and the outer layer. For example, the intermediate layer composed of polypropylene modified with maleic anhydride may be used.

First, the materials used for inner layer of the multi-layer hose for automobile cooling systems according to the present invention will be explained.

The materials for inner layer comprise a composition which contains a polymer having a carboxyl group and/or its derivative group in the molecule and a thermoplastic elastomer. These components will be specifically explained.

1. Polymer Having a Carboxyl Group and/or Its Derivative Group in the Molecule

In the present invention, for developing adhesiveness at the interface with the polyamide material as a material for outer layer, a dynamically crosslinked olefin thermoplastic elastomer in combination with a polymer having a carboxyl group and/or its derivative group in the molecule are used as the material for inner layer.

The term "derivative group" means a group which is obtained by a chemical reaction of a carboxyl group and has adhesion to polyamide materials. For example, an anhydride group, a glycidyl ester group, an amide group and an imide group may be mentioned.

Here, the polymer having a carboxyl group and/or its derivative group in the molecule of the present invention has no limitation, and any polymers can be used as far as a carboxyl group and/or its derivative group are introduced into the polymers. Preferred are polyolefin resins having a carboxyl group and/or its derivative group. Examples thereof are (a) polymers which are modified so that they have a carboxyl group and/or its derivative group, preferably olefin polymers modified with an ethylenically unsaturated carboxylic acid and/or a derivative thereof, and (b) polymers containing an ethylenically unsaturated carboxylic acid and/or a derivative thereof as a copolymer component or a graft component, preferably olefin polymers containing an ethylenically unsaturated carboxylic acid and/or a derivative thereof as a copolymer component or a graft component.

The polymers of type (a) or (b) mentioned above may be used directly or by diluting those with other resins (preferably a polyolefin resin).

The polymers of type (a) mentioned above will be explained in detail.

The polymers which are modified so as to have a carboxyl group and/or its derivative group have no special limitation, but are preferably olefin polymers. The olefin polymers which are preferably used include, for example, homopolymers or copolymers mainly composed of an olefin of 2–12 carbon atoms. Examples of these olefin polymers are polyethylene, polypropylene, polybutene, copolymers comprising ethylene and at least one α-olefin of 3–12 carbon atoms, copolymers comprising ethylene, an α-olefin of 3–12 carbon atoms and a non-conjugated diene, and copolymers comprising propylene and at least one α-olefin of 2–12 carbon atoms. Among them, polyethylene and polypropylene are suitable because they are easily and inexpensively available.

There is no special limitation in the method for the modification of olefin polymers as far as a carboxyl group and/or its derivative group can be introduced into the molecule of the olefin polymer which is a base. For example, mention may be made of a method of reacting the polymers with carbon dioxide to introduce carboxyl group into the molecule of the polymers, but preferred is a method of modifying the olefin polymers with an ethylenically unsaturated carboxylic acid or a derivative thereof. As examples of the ethylenically unsaturated carboxylic acids or derivatives thereof, mention may be made of maleic acid, halogenated maleic acid, fumaric acid, itaconic acid, cis-4-cyclohexene-1,2-dicarboxylic acid and endo-cis-bicyclo(2,2,1)-5-heptene-2,3-dicarboxylic acid, and anhydrides or glycidyl derivatives of these dicarboxylic acids. Among them, maleic anhydride is particularly preferred because it is cheaply available and easily reacts with the olefin polymers. The olefin polymers modified with maleic anhydride are commercially available as maleic anhydride-modified polypropylene, maleic anhydride-modified polyethylene and the like, and these can be easily produced and are especially preferred.

A specific method for modifying olefin polymers with ethylenically unsaturated carboxylic acids or derivatives thereof is, for example, a method of reacting an olefin polymer with an ethylenically unsaturated carboxylic acid or a derivative thereof by passing them through an extruder in the presence of a radical initiator.

Amount of the ethylenically unsaturated carboxylic acid or its derivative component (monomer) is preferably 0.05–40% by weight, more preferably 0.05–20% by weight, especially preferably 0.1–10% by weight based on the total weight of the polymer (If a resin to dilute the polymer is used, the resin is included in the polymer.). If the amount is less than 0.05% by weight, the effect to improve the adhesion at the interface is slight. Even if it exceeds 40% by weight, substantially no increase of the adhesion is recognized.

Next, the above polymers of type (b) will be explained in detail.

These polymers are specifically copolymers of an olefin monomer and an ethylenically unsaturated carboxylic acid and/or its derivative monomer, or polymers comprising an olefin polymer on which is grafted an ethylenically unsaturated carboxylic acid and/or its derivative monomer.

First, the copolymers will be explained.

Ethylene, propylene and the like are preferred examples of the olefin monomers constituting the copolymers. Examples of the ethylenically unsaturated carboxylic acid or its derivative monomer are monocarboxylic acids such as acrylic acid, methacrylic acid and crotonic acid, dicarboxylic acids such as maleic acid, halogenated maleic acid, fumaric acid, itaconic acid, cis-4-cyclohexene-1,2-dicarboxylic acid and endo-cis-bicyclo(2,2,1)-5-heptene-2,3-dicarboxylic acid and anhydrides, half esters and imides of these dicarboxylic acids, and amides such as acrylamide and methacrylamide. Further, esters of monocarboxylic acids such as glycidyl acrylate and glycidyl methacrylate and esters or half esters of dicarboxylic acids, which have a functional group having adhesion to polyamide materials, may be exemplified. Among them, especially preferred are acrylic acid, methacrylic acid, maleic anhydride and glycidyl methacrylate.

Specific examples of the copolymers are ethylene-maleic anhydride copolymer, ethylene-acrylic acid copolymer, and ethylene-methacrylic acid copolymer.

These copolymers may be used each alone or in combination of two or more.

Amount of the ethylenically unsaturated carboxylic acid or its derivative is preferably 0.05–40% by weight, more preferably 0.05–20% by weight, especially preferably 0.1–10% by weight based on the total weight of the copolymer (If a resin to dilute the copolymer is used, the resin is included in the copolymer.). If the amount is less than 0.05% by weight, the effect to improve the adhesion at the interface is slight. Even if it exceeds 40% by weight, substantially no increase of the adhesion is recognized.

Next, the graft polymers will be explained.

As the olefin polymers on which an ethylenically unsaturated carboxylic acid and/or its derivative monomer are grafted, there may be used the same olefin polymers as those which are modified so as to give a carboxyl group and/or its derivative group as explained as to the polymers of type (a).

That is, homopolymers or copolymers mainly composed of an olefin of 2–12 carbon atoms can be generally used. Examples of these olefin polymers are polyethylene, polypropylene, polybutene, copolymers comprising ethylene and at least one α-olefin of 3–12 carbon atoms, copolymers comprising ethylene, an α-olefin of 3–12 carbon atoms and a non-conjugated diene, and copolymers comprising propylene and at least one α-olefin of 2–12 carbon atoms. Among them, polyethylene and polypropylene are easily and cheaply available and are suitable.

On the other hand, examples of the ethylenically unsaturated carboxylic acid and/or its derivative monomer to be grafted are acrylic acid, methacrylic acid and glycidyl methacrylate.

Specific examples of the graft polymers are acrylic acid-grafted polyethylene and methacrylic acid-grafted polyethylene.

Amount of the ethylenically unsaturated carboxylic acid and/or its derivative is preferably 0.05–40% by weight, more preferably 0.05–20% by weight, especially preferably 0.1–10% by weight based on the total weight of the graft polymer (If a resin to dilute the graft polymer is used, the resin is included in the graft polymer.). If the amount is less than 0.05% by weight, the effect to improve the adhesion at the interface is slight. Even if it exceeds 40% by weight, substantially no increase of the adhesion is recognized.

2. Thermoplastic Elastomer

The material used as the inner layer of the multi-layer hose for automobile cooling systems of the present invention comprises a composition comprising a polymer containing a carboxyl group and/or its derivative group in the molecule and a thermoplastic elatomer, and the thermoplastic elastomer used here is an olefin thermoplastic elastomer subjected to dynamic crosslinking.

The olefin thermoplastic elastomer is preferably one which comprises an olefin resin such as polyethylene or polypropylene to which is added an olefin elastomer such as ethylene-butene copolymer, ethylene-hexene copolymer or ethylene-octene copolymer, thereby giving flexibility. Here, the olefin elastomer may be completely dissolved in the olefin resin or may be dispersed without being completely dissolved in the olefin resin, but the olefin elastomer must be one which is crosslinked.

That is, the thermoplastic elastomer used as a material for inner layer of the multi-layer hose for automobile cooling systems of the present invention is a dynamically crosslinked olefin thermoplastic elastomer which comprises (A) 10–90 parts by weight of an ethylene-α-olefin copolymer comprising ethylene and an α-olefin of 3–12 carbon atoms which is produced using a metallocene catalyst and (B) 90–10 parts by weight of a propylene resin [total amount of (A) and (B) being 100 parts by weight]. This dynamically crosslinked olefin thermoplastic elastomer is especially excellent in flexibility, heat resistance, chemical resistance, mechanical strength, and the like.

The α-olefins of 3–12 carbon atoms include, for example, propylene, butene-1, pentene-1, hexene-1, 4-methylpentene-1, heptene-1, octene-1, nonene-1, decene-1, undecene-1 and dodecene-1. Among them, hexene-1, 4-methylpentene-1 and octene-1 are preferred, and octene-1 is especially preferred. Octene-1 is superior in the effect of flexibilization even with addition in a small amount, and the resulting copolymer with ethylene is superior in mechanical strength. Furthermore, the ethylene-α-olefin copolymer may contain a non-conjugated diene such as ethylidenenorbornene or dicyclopentadiene as a third component.

The ethylene-α-olefin copolymer which is the component (A) can be produced using Ziegler catalysts or metallocene catalysts.

The metallocene catalysts generally comprise a promoter and a cyclopentadienyl derivative of a metal of Group IV, such as titanium or zirconium, and they are not only high in activity as polymerization catalysts, but also, as compared with conventional Ziegler catalysts, give polymers which are narrower in molecular weight distribution and which have a more uniform distribution of α-olefin of 3–12 carbon atoms as a comonomer.

Therefore, the ethylene-α-olefin copolymers produced using metallocene catalysts greatly differ in properties from those obtained using Ziegler catalysts The features of the ethylene-α-olefin copolymers comprising ethylene and an α-olefin which are produced using metallocene catalysts are enumerated below.

1. Because of the high activity of the polymerization catalysts, composition of α-olefin as a comonomer can be conspicuously increased, and elastomer-like polymers high in flexibility can be obtained even in the state of containing no plasticizers.

2. The copolymers have more uniform distribution of the comonomers as compared with polymers obtained using Ziegler catalysts. Therefore, the reaction site can be uniform in the crosslinking reaction.

3. The copolymers have a very sharp molecular weight distribution, contain little low-molecular weight components, are excellent in mechanical strength and workability and have high quality as compared with polymers obtained using Ziegler catalysts.

4. In spite of the sharp molecular weight distribution, in the case of introducing a long chain branching, the copolymers have a high ratio (I10/I2) of a melt index (I10) at 190° C./10 kg load and a melt index (I2) at 190° C./2.16 kg load as specified by ASTM D1238, and thus the copolymers are excellent in workability.

5. Even if the copolymerization ratio of the α-olefin is high, the copolymers have microcrystalline portion, hardly cause blocking, and can have the form of pellets.

Therefore, by using the ethylene-α-olefin copolymers produced using metallocene catalysts, hoses can be obtained which are more flexible and higher in mechanical strength and endurance than those of hoses made using ethylene-α-olefin copolymers produced with Ziegler catalysts.

In order to give sufficient flexibility to the ethylene-α-olefin copolymers which are the component (A), it is necessary that the copolymerization ratio of the α-olefin is preferably 10–50% by weight, more preferably 20–45% by weight.

Density of the ethylene-α-olefin copolymers which are the component (A) is preferably 0.8–0.9 g/cm$^3$ from the point of balancing of mechanical strength and flexibility.

Moreover, melt index of the ethylene-α-olefin copolymers is preferably 0.1–10 g/10 min (190° C. under a load of 2.16 kg).

The propylene resins as the component (B) of the thermoplastic elastomer of the present invention include, for example, isotactic or syndiotactic polypropylene homopolymers and isotactic or syndiotactic propylene copolymers of propylene with other α-olefins such as ethylene, butene-1, pentene-1 and hexene-1. The melt index of these propylene resins is preferably 0.1–100 g/10 min (230° C. under a load of 2.16 kg). If the melt index exceeds 100 g/10 min, heat resistance and mechanical strengths such as bonding strength of the dynamically crosslinked olefin thermoplastic elastomers tend to be deteriorated, and if it is less than 0.1 g/10 min, the elastomers are inferior in fluidity and deteriorated in molding workability.

In the present invention, if necessary, a softening agent can be added for the improvement of flexibility and workability of the dynamically crosslinked olefin thermoplastic elastomers.

The softening agent is preferably a process oil such as paraffinic or naphthenic type. The softening agent is used in an amount of 0–250 parts by weight, preferably 10–150 parts by weight based on 100 parts by weight of the ethylene-α-olefin copolymer which is the component (A) for the adjustment of hardness and flexibility of the composition. If the amount of the softening agent exceeds 250 parts by weight, there is seen a high amount of bleeding of the oil.

Furthermore, other resins or elastomers may be added to the dynamically crosslinked olefin thermoplastic elastomers to such extent as not damaging the characteristics thereof.

The olefin thermoplastic elastomer used as the material for inner layer of the present invention is dynamically crosslinked, and this dynamic crosslinking is carried out by adding a radical initiator such as an organic peroxide, or a radical initiator and a crosslinking aid to the ethylene-α-olefin copolymer which is the component (A) and the propylene resin which is the component (B) and mechanically melt-kneading them using a twin-screw extruder, Banbury mixer or the like. By crosslinking the ethylene-α-olefin copolymer which is the component (A), thermoplastic elastomer excellent in mechanical strength, heat resistance and chemical resistance can be obtained.

Examples of the radical initiators used preferably here are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

These radical initiators are used in an amount of 0.02–3 parts by weight, preferably 0.05–1 part by weight based on 100 parts by weight of the ethylene-α-olefin copolymer which is the component (A).

As the crosslinking aids, there may be preferably used triallyl isocyanurate, triallyl cyanurate, divinylbenzene, trimethylolpropane trimethacrylate, trimethylolpropane triacrylate, ethylene glycol dimethacrylate, triethylene glycol dimethacrylate, diethylene glycol dimethacrylate, phenylmaleimide, allyl methacrylate, N,N'-m-phenylenebismaleimide, 1,2-polybutadiene, and the like. These crosslinking aids may also be used in combination of two or more.

These crosslinking aids are used in an amount of 0.1–5 parts by weight, preferably 0.5–2 parts by weight based on 100 parts by weight of the ethylene-α-olefin copolymer which is the component (A).

The material for inner layer of the present invention comprises a composition containing the above-mentioned polymer (preferably a polyolefin polymer) containing a carboxyl group and/or its derivative group in the molecule and the dynamically crosslinked olefin thermoplastic elastomer. For preparing the composition, the polymer containing a carboxyl group and/or its derivative group and the thermoplastic elastomer are melt-kneaded or pellet-blended. Furthermore, the composition which is used as the material for inner layer may be prepared by allowing the polymer containing a carboxyl group and/or its derivative group in the molecule to coexist in preparing the thermoplastic elastomer, namely, in dynamic crosslinking of the ethylene-α-olefin copolymer and the polypropylene resin, and thus carrying out the dynamic crosslinking.

For carrying out the melt-kneading, the generally used melt-kneaders may be employed. Examples of the melt-kneaders are batch type kneaders such as mixing roll, Banbury mixer and pressure kneader, and continuous type kneaders such as single-screw extruders and twin-screw extruders.

When in the polymer containing a carboxyl group and/or its derivative group, the polymer component which is the base is a polyolefin polymer and the thermoplastic elastomer is a dynamically crosslinked olefin thermoplastic elastomer, they are more uniformly mixed especially by the melt-kneading.

The content of the polymer containing a carboxyl group and/or its derivative group thereof in the molecule is 5–50% by weight, preferably 10–40% by weight, based on the total weight of the composition.

If the proportion of the polymer containing a carboxyl group and/or its derivative group is less than 5% by weight, adhesion to the polyamide thermoplastic resin which is the material for outer layer is inferior, and if it exceeds 50% by weight, flexibility of the multi-layer hose for automobile cooling systems is inferior.

In addition, the proportion of the polymer containing a carboxyl group and/or its derivative group in the molecule and the thermoplastic elastomer is preferably 5–50% by weight of the polymer containing a carboxyl group and/or its derivative group and 50–95% by weight of the thermoplastic elatomer based on the total weight of the composition. More preferably, the proportion is 10–40% by weight of the polymer containing a carboxyl group and/or its derivative group and 60–90% by weight of the thermoplastic elastomer based on the total weight of the composition.

The composition which contains the polymer containing a carboxyl group and/or its derivative group and the thermoplastic elastomer and which is the material for inner layer of the present invention can contain inorganic fillers, stabilizers, lubricants and the like to such an extent as not damaging the characteristics of the composition.

The material for inner layer of the multi-layer hose for automobile cooling systems is required to have the following various characteristics.

(1) High-temperature and Long-term Endurance Against Anti-freeze

In the case of evaluating the endurance against anti-freeze of hoses comprising general various olefin elastomers, the phenomenon is observed that cracks occur on the inner surface which contacts with an anti-freeze and they grow to result in rupture of the hoses. Furthermore, it is considered that the cracks occur due to the microvoids in the olefin thermoplastic elastomer which are produced during endurance test or during bending process of the hoses.

The inventors conducted investigation in detail on the relation between tensile characteristics (especially, S—S curve) of the composition containing the polymer (preferably a polyolefin polymer) having a carboxyl group and/or its derivative group in the molecule and the dynamically crosslinked olefin thermoplastic elastomer and the occurrence of the microvoids in the composition, and, as a result, they found the following facts.

That is, when the strength at break was greater than the strength at yield point, very few microvoids occurred and, as a result, endurance against anti-freeze was markedly improved. On the other hand, when the strength at break was smaller than the strength at yield point, a large number of microvoids occurred and, as a result, endurance against anti-freeze was insufficient.

Therefore, in case the endurance against anti-freeze must be further improved in the composition used for inner layer, it is desired that the strength at break was greater than the strength at yield point in its tensile characteristics (S—S curve).

As a specific method for making greater the strength at break than the strength at yield point, mention may be made of, for example, a method of raising the content of the crosslinked ethylene-α-olefin copolymer in the dynamically crosslinked olefin thermoplastic elastomer (that is, reducing the hardness).

(2) Surface Hardness

In order to maintain the flexibility as a hose and inhibit occurrence of the microvoids, it is desired that the surface hardness (JIS D type) of the composition containing the polymer (preferably a polyolefin polymer) having a carboxyl group and/or its derivative group in the molecule and the dynamically crosslinked olefin thermoplastic elastomer is not more than 60.

(3) Bending Stress

In order to maintain the flexibility as a hose and inhibit occurrence of the microvoids, it is desired that the bending stress of a sheet of 2 mm thick of the composition containing the polymer (preferably a polyolefin polymer) having a carboxyl group and/or its derivative group in the molecule and the dynamically crosslinked olefin thermoplastic elastomer is not more than 200 gf/mm$^2$.

(4) Water Vapor Permeability

The composition containing the polymer (preferably a polyolefin polymer) having a carboxyl group and/or its derivative group in the molecule and the dynamically crosslinked olefin thermoplastic elastomer is required to have a low water vapor permeability. Specifically, the water vapor permeability is preferably not more than 5 g/m$^2$·hr, more preferably not more than 1.5 g/m$^2$·24 hr.

(5) Retainability of Properties Against Anti-freeze

The composition containing the polymer (preferably a polyolefin polymer) having a carboxyl group and/or its derivative group in the molecule and the dynamically crosslinked olefin thermoplastic elastomer is required to retain tensile characteristics even after being dipped in an anti-freeze for a long time. Specifically, it is desired that the retention rate of tensile break strength of a sample (JIS No.3 dumbbell) is not less than 80%, more preferably not less than 90% when the sample is dipped in a mixed solution of ethylene glycol and deionized water (1:1) as an anti-freeze for 500 hours at 130° C. Further, it is also desired that the retention rate of tensile break elongation of a sample is not less than 70%, more preterably not less than 80% under the same dipping condition as the retention rate of tensile break strength.

In this connection, the retention rate of tensile break strength and the retention rate of tensile break elongation are defined as follows:

$$\text{retention rate of tensile break strength} = \frac{\text{tensile break strength after dipping}}{\text{tensile break strength before dipping}} \times 100$$

$$\text{retention rate of tensile break elongation} = \frac{\text{tensile break elongation after dipping}}{\text{tensile break elongation before dipping}} \times 100$$

(6) Impact Brittleness Temperature

Assuming that the hose is used at a cold district, the impact brittleness temperature of the composition containing the polymer (preferably a polyolefin polymer) having a carboxyl group and/or its derivative group in the molecule and the dynamically crosslinked olefin thermoplastic elastomer is preferably not higher than –20° C., more preferably not higher than –30° C.

The composition containing the polymer having a carboxyl group and/or its derivative group in the molecular and the thermoplastic elastomer which is the material for inner layer of the multi-layer hose can comprehensively attain the above characteristics by using a dynamically crosslinked olefin thermoplastic elastomer as the thermoplastic elastomer and further using an ethylene-α-olefin copolymer comprising ethylene and α-olefin of 3–12 carbon atoms which is produced using a metallocene catalyst as its rubber component.

Next, materials used as outer layer of multi-layer hose for automobile cooling systems of the present invention will be explained.

As the materials for outer layer, polyamide thermoplastic resins are used. As such polyamide thermoplastic resins, there may be used general polyamide resins or various nylon resins. Preferred are polyamide resins having a melting point of 200° C. or higher which are excellent in heat resistance and strength.

Examples of them are nylon 6, nylon 66, nylon 46, nylon 610, nylon 612, nylon 66/6T, nylon 66/6I, nylon 66/6T/6I, nylon 11, nylon 12, and mixtures thereof.

For developing the flexibility as a multi-layer hose, nylon 12, nylon 11 and the like which are relatively flexible polyamide resins are preferred.

There is no special limitation in polymerization degree of the polyamide thermoplastic resins.

The polyamide thermoplastic resins which are materials for outer layer may contain additives such as inorganic fillers, stabilizers, lubricants, crystal nucleating agents and silanes to such an extent as not damaging the characteristics.

Method for producing the multi-layer hose for automobile cooling systems according to the present invention will be explained below.

The multi-layer hose for automobile cooling systems according to the present invention can be produced by molding the respective layers by co-extrusion method or blow molding method or combination of them.

It is necessary that the inner layer and the outer layer of the multi-layer hose for automobile cooling systems according to the present invention closely adhere to each other. That is, it is desirable that when the inner layer and the outer layer are peeled off from each other after molding, they are not smoothly separated at their interface, but they are in the state of cohesive separation where the respective materials are partially ruptured.

Furthermore, in order to compactly put the multi-layer hose for automobile cooling systems in a limited space in an automobile and to further increase the endurance as a hose by absorbing vibration of engine and others, the hose of the present invention is required to be more flexible. That is, by using flexible materials as materials for inner layer and outer layer, even a hose in the form of a straight pipe can be used after subjecting to bending process. For easier bending, a bellows structure may be formed at the portion to be bent.

As mentioned above, the multi-layer hose for automobile cooling systems of the present invention is light in weight and flexible and, besides, excellent in endurance. Furthermore, since the composition is thermoplastic, it can be molded easily and into various shapes. Thus, the multi-layer hose for automobile cooling systems of the present invention is useful as radiator hoses of four-wheeled cars, motor bicycles, and the like, and is light in weight and can be recycled. Therefore, it has a great social significance from the points of energy saving and solution of environmental problems.

DESCRIPTION OF PREFERRED EMBODIMENTS

The present invention will be explained in more detail by the following examples and comparative examples, which are not intended for purpose of limitation. Test methods employed for evaluation of various properties in the examples and the comparative examples are shown below.

(1) Surface Hardness

Four sheets (each sheet having a thickness of 2 mm) of the material for inner layer were stacked, and the evaluation was conducted in accordance with JIS K6253-93, by D type, at 23° C.

(2) Tensile Break Strength [MPa]

The evaluation was conducted in accordance with JIS K6251 at 23° C.

(3) Tensile Break Elongation [%]

The evaluation was conducted in accordance with JIS K6251 at 23° C.

(4) Bending Stress (gf/mm$^2$)

This was obtained by calculation from bending stress value of a sheet (2 mm thick) of the dynamically crosslinked olefin thermoplastic elastomer composition in accordance with ASTM D790.

(5) Water Vapor Permeability

This was obtained in the following manner. A hose (diameter: 20 mm, length: 300 mm, thickness: 2 mm) of the material for inner layer was made and this was filled with deionized water. Both ends of the hose was closed and put in a thermostatic chamber of 100° C. for 100 hours, and the water vapor permeability (g/m$^2$·24 hr) was measured from the weight changing before and after lapse of 100 hours.

(6) Retention of Properties when Exposed to Anti-freeze

A material for inner layer (JIS No.3 dumbbell) was dipped in a mixed solution of ethylene glycol and deionized water (1:1) as an anti-freeze at 130° C. for 500 hours. Then, retention rate of tensile break strength and retention rate of tensile break elongation of the sample were obtained on the basis of the tensile break properties before dipping in the anti-freeze.

(7) Impact Brittleness Temperature

Impact brittleness temperature of the material for inner layer was measured in accordance with JIS K6301.

(8) Adhesion

The inner layer and the outer layer of the multi-layer hose was peeled off from each other and the surface of the peeled portion was observed by a microscope, and it was judged whether they were in the state of cohesive peeling or interfacial peeling.

(9) Endurance Against Anti-freeze

A multi-layer hose was filled with a mixed solution of ethylene glycol and deionized water (1:1) as an anti-freeze under heating and pressuring conditions of 130° C. and 2 kg/cm$^2$, and the time before the hose was ruptured was measured.

The following were used as the components in the examples and comparative examples.

(a) Ethylene-α-olefin Copolymers (1) A Copolymer of Ethylene and Octene-1 (Referred to as "EOR-1")

This was prepared by the process using a metallocene catalyst. Content of octene-1: 28% by weight; density: 0.87 g/cm$^3$; MFR: 0.5 (190° C.×2.16 kg); Mw/Mn=2.4. This had a long chain branching.

(2) Ethylene-propylene-ethylidenenorbornene Copolymer (Referred to as "EPDM1")

This was prepared by the process using a metallocene catalyst. Content of propylene: 25% by weight; content of ethylidenenorbornene: 9% by weight; density: 0.87 g/cm$^3$; MFR: 0.5 (190° C.×2.16 kg). This had a long chain branching.

(3) Ethylene-propylene-ethylidenenorbornene Copolymer (Referred to as "EPDM2")

This was prepared by the process using a Ziegler catalyst. Content of propylene: 25% by weight; content of ethylidenenorbornene: 6% by weight; density: 0.87 g/cm$^3$; MFR: 0.5 (190° C.×2.16 kg). This had no long chain branching.

(b) Propylene Resins (1) Isotactic Polypropylene Homopolymer (Referred to as "PP1")

MFR: 15 (230° C.×2.16 kg)

(2) Isotactic Polypropylene Homopolymer (Referred to as "PP2")

MFR: 1 (230° C.×2.16 kg)

(c) Softening Agent

Paraffin oil (referred to as "MO").

Diana Process Oil PW-380 (manufactured by Idemitsu Kosan Co., Ltd.).

(d) Radical Initiator 2,5-Dimethyl-2,5-bis(t-butylperoxy)hexyne-3 (referred to as "POX").

(e) Crosslinking Aid

Triallyl isocyanurate (referred to as "TAIC").

(f) Carboxylic Acid-modified (co)polymers (1) Maleic Anhydride-modified PP (Referred to as "MPP")

A copolymer obtained by reacting an isotactic polypropylene homopolymer with maleic anhydride to modify the polymer with carboxylic acid. Content of maleic anhydride: 0.2 part by weight.

(2) Glycidyl Methacrylate-grafted PP (Referred to as "GPP")

A copolymer obtained by graft-polymerizing glycidyl methacrylate with an isotactic polypropylene homopolymer. Content of glycidyl methacrylate: 0.99 part by weight.

(3) Ethylene-acrylic acid copolymer (Referred to as "EAA")

A copolymer of ethylene and acrylic acid. Content of acrylic acid: 11% by weight.

(f) Polyamide Thermoplastic Resins (1) Nylon 6

AMILAN CM2001 (manufactured by Toray Industries, Ltd.) was used.

(2) Nylon 12

RILSAN AESNOTL (manufactured by Toray Industries, Ltd.) was used.

Examples 1–11 and Comparative Examples 1–2

A twin-screw extruder having a pouring port at the center of barrel was used as an extruder. As the screw, a double-thread screw having kneading parts with kneading discs before and after the pouring port.

First, 55 parts by weight of EOR and 45 parts by weight of PP1 were melt-kneaded by the twin-screw extruder (cylinder temperature: 220° C.) to prepare pellets. Then, the resulting pellets to which 0.5 part by weight of POX and 1.0 part by weight of TAIC were adhered were again introduced from the hopper of the above extruder (cylinder temperature: 220° C.). 60 Parts by weight of MO was added from the pouring port at the center of the barrel and melt-kneading and dynamic crosslinking reaction were carried out, followed by pelletizing to prepare a thermoplastic elastomer (referred to as "TPO-1 (EOR)").

Furthermore, a thermoplastic elastomer (referred to as "TPO-2 (EOR)") was prepared in the same manner as above, except that EOR was used in an amount of 80 parts by weight, PP1 was used in an amount of 20 parts by weight and MO was used in an amount of 65 parts by weight.

Moreover, a thermoplastic elastomer (referred to as "TPO-3 (EPDM1)") was prepared in the same manner as above, except that EPDM1 was used in an amount of 55 parts by weight, PP1 was used in an amount of 45 parts by weight and MO was used in an amount of 60 parts by weight.

Furthermore, a thermoplastic elastomer (referred to as "TPO-4 (EPDM2)") was prepared in the same manner as above, except that EPDM2 was used in an amount of 55 parts by weight, PP1 was used in an amount of 45 parts by weight and MO was used in an amount of 60 parts by weight.

Then, using the same twin-screw extruder as used above, pellets of the above thermoplastic elastomer, a given amount of the olefin polymer containing a carboxyl group and/or its derivative group in the molecule as shown in Table 1 and PP and others were blended, melt-kneaded and pelletized to obtain a composition comprising the olefin polymer containing a carboxyl group and/or its derivative group in the molecule and a dynamically crosslinked olefin thermoplastic elastomer.

The resulting composition and a polyamide thermoplastic resin were co-extruded using a co-extrusion molding machine (extruder temperature for inner layer: 200° C., extruder temperature for outer layer: 240° C.) to make a multi-layer hose having an inner diameter of 30 mm in the form of a straight pipe. Thickness of the inner layer was 1.5 mm and that of the outer layer was 1.0 mm.

The results of evaluations are shown in Table 1.

TABLE 1

|  |  | Example | | | | | | | Comparative Example | |
|---|---|---|---|---|---|---|---|---|---|---|
|  |  | 1 | 2 | 3 | 4 | 5 | 6 | 7 | 1 | 2 |
| Composition of material for inner layer (part by weight) | TPO-1 (EOR) | 60 | 80 |  | 80 | 70 | 80 | 20 | 100 |  |
|  | TPO-2 (EOR) |  |  |  |  |  |  |  |  |  |
|  | TPO-3 (EPDM1) |  |  | 80 |  |  |  |  |  |  |
|  | TPO-4 (EPDM2) |  |  |  |  |  |  |  |  | 80 |
|  | PP2 | 20 |  |  |  |  |  | 60 |  |  |
|  | MPP | 20 | 20 | 20 |  |  | 20 | 20 |  | 20 |
|  | GPP |  |  |  | 20 |  |  |  |  |  |
|  | EAA |  |  |  |  | 30 |  |  |  |  |
| Composition of material for outer layer (part by weight) | Nylon 6 |  |  |  |  |  | 100 |  |  |  |
|  | Nylon 12 | 100 | 100 | 100 | 100 | 100 |  | 100 | 100 | 100 |
| Properties of material for inner layer | Surface hardness | 50 | 47 | 48 | 47 | 45 | 47 | 70 | 32 | 49 |
|  | Tensile break strength (MPa) | 19 | 16 | 14 | 15 | 13 | 16 | 19 | 9 | 13 |
|  | Tensile break elongation (%) | 600 | 580 | 550 | 570 | 550 | 580 | 840 | 460 | 520 |
|  | The higher strength between yield strength and break strength | Break strength | Break strength | Break strength | Break strength | Break strength | Break strength | Yield strength | Break strength | Break strength |
|  | Bending stress (gf/mm$^2$) | 110 | 80 | 80 | 80 | 70 | 80 | 190 | 30 | 90 |
|  | Water vapor permeability (g/m$^2$ · 24 h) | 0.7 | 0.9 | 1.1 | 1.0 | 1.1 | 0.9 | 0.2 | 1.7 | 1.2 |
|  | Retention of tensile break strength against anti-freeze (%) | 99 | 99 | 95 | 97 | 92 | 99 | 99 | 99 | 90 |
|  | Retention of tensile break elongation against anti-freeze (%) | 90 | 91 | 83 | 90 | 87 | 91 | 80 | 96 | 77 |
|  | Impact brittleness temperature (° C.) | Not higher than −60 | Not higher than −60 | Not higher than −60 | Not higher than −60 | Not higher than −60 | Not higher than −60 | −22 | Not higher than −60 | Not higher than −60 |
| Properties as multi-layer hose | Adhesion | Cohesive peeling | Cohesive peeling | Cohesive peeling | Cohesive peeling | Cohesive peeling | Cohesive peeling | Cohesive peeling | Interfacial peeling | Cohesive peeling |
|  | Endurance against anti-freeze (hr) | 370 | 460 | 390 | 430 | 400 | 520 | 320 | 150 | 250 |

Furthermore, multi-layer hoses having an inner diameter of 14 mm, a thickness of inner layer of 1.5 mm and a thickness of outer layer of 1.0 mm were made by the same molding method as above, and then a bellows portion was formed at the center part thereof.

The results of evaluations are shown in Table 2.

TABLE 2

| | | Example | | | |
|---|---|---|---|---|---|
| | | 8 | 9 | 10 | 11 |
| Composition of material for inner layer (part by weight) | TPO-1 (EOR) | 20 | 80 | 20 | |
| | TPO-2 (EOR) | | | 60 | 80 |
| | TPO-3 (EPDM1) | | | | |
| | TPO-4 (EPDM2) | | | | |
| | PP2 | 60 | | | |
| | MPP | 20 | 20 | 20 | 20 |
| | GPP | | | | |
| | EAA | | | | |
| Composition of material for outer layer (part by weight) | Nylon 6 | | | | |
| | Nylon 12 | 100 | 100 | 100 | 100 |
| Properties of material for inner layer | Surface hardness | 70 | 47 | 32 | 25 |
| | Tensile break strength (MPa) | 19 | 16 | 12 | 10 |
| | Tensile break elongation (%) | 840 | 580 | 550 | 540 |
| | The higher strength between yield strength and break strength | Yield strength | Break strength | Break strength | Break strength |
| | Bending stress (gf/mm²) | 190 | 80 | 25 | 20 |
| | Water vapor permeability (g/m² · 24 h) | 0.2 | 0.9 | 1.1 | 1.9 |
| | Retention of tensile break strength against anti-freeze (%) | 99 | 99 | 99 | 99 |
| | Retention of tensile break elongation against anti-freeze (%) | 80 | 91 | 92 | 94 |
| | Impact brittleness temperature (° C.) | −22 | Not higher than −60 | Not higher than −60 | Not higher than −60 |
| Properties as multi-layer hose | Adhesion | Cohesive peeling | Cohesive peeling | Cohesive peeling | Cohesive peeling |
| | Endurance against anti-freeze (hr) | 330 | 470 | 520 | 380 |

The multi-layer hoses of the Examples were all satisfactory in moldability, high in flexibility and satisfactory in endurance against anti-freeze. Further, there was no problem in adhesion between the inner layer and the outer layer. As the materials for inner layer, those which were higher in strength at break than strength at yield point in tensile characteristics and had a surface hardness of not more than 60 were further superior as hoses for automobile cooling systems. Especially, the multi-layer hoses made using materials for inner layer having a surface hardness of 30–50 were excellent.

What is claimed is:

1. A multi-layer hose for automobile cooling systems comprising at least two layers of inner layer and outer layer wherein:
    (1) the material for inner layer is a composition which comprises a polymer containing a carboxyl group and/or its derivative group in the molecule and a thermoplastic elastomer, the content of the polymer containing a carboxyl group and/or its derivative group thereof in the molecule being 5–50% by weight based on the total weight of the composition, and
    (2) the material for outer layer comprises a polyamide thermoplastic resin,
        wherein said thermoplastic elastomer of the composition for the inner layer is a dynamically crosslinked olefin thermoplastic elastomer which comprises (A) 10–90 parts by weight of an ethylene-α-olefin copolymer comprising ethylene and an α-olefin of 3–12 carbon atoms which is produced using a metallocene catalyst and (B) 90–10 parts by weight of a propylene resin (total amount of (A) and (B) being 100 parts by weight).

2. A multi-layer hose for automobile cooling systems according to claim 1, wherein the polymer containing a carboxyl group and/or its derivative group in the molecule is a polymer modified so as to have a carboxyl group and/or its derivative group or a polymer containing an ethylenically unsaturated carboxylic acid and/or its derivative as a copolymer component or a graft component.

3. A multi-layer hose for automobile cooling systems according to claim 2, wherein the polymer containing a carboxyl group and/or its derivative group in the molecule is an olefin polymer modified with an ethylenically unsaturated carboxylic acid and/or its derivative or an olefin polymer containing an ethylenically unsaturated carboxylic acid and/or its derivative as a copolymer component or a graft component.

4. A multi-layer hose for automobile cooling systems according to claim 3, wherein the amount of the ethylenically unsaturated carboxylic acid monomer and/or its derivative monomer is 0.05–40% by weight based on the total weight of the polymer.

5. A multi-layer hose for automobile cooling systems according to any one of claims 1–4, wherein the composition which is the material for inner layer has a strength at break higher than a strength at yield point in tensile characteristics.

6. A multi-layer hose for automobile cooling systems according to any one of claims 1–4, wherein the composition which is the material for inner layer has a surface hardness (JIS D scale) of not higher than 60.

7. A multi-layer hose for automobile cooling systems according to claim 1, wherein the derivative group is a group obtained by a chemical reaction of the carboxyl group, and wherein the derivative group has adhesion to the material (2) for outer layer comprising a polyamide thermoplastic resin.

8. A multi-layer hose for automobile cooling systems according to claim 1, further comprising an intermediate layer comprising polypropylene modified with maleic anhydride.

9. A multi-layer hose for automobile cooling systems according to claim 7, wherein the derivative group is at least one selected from the group consisting of an anhydride, a glycidyl ester, an amide and an imide.

10. A multi-layer hose for automobile cooling systems according to claim 1, wherein the polymer containing a carboxyl group and/or its derivative group is formed by modifying an olefin polymer by:
    1) reacting the olefin polymer with carbon dioxide; or
    2) reacting the olefin polymer with an ethylenically unsaturated carboxylic acid, which is at least one selected from the group consisting of maleic acid, halogenated maleic acid, fumaric acid, itaconic acid, cis-4-cyclohexene-1,2-dicarboxylic acid, endo-cis-bicyclo(2, 2,1)-5-heptene-2,3-dicarboxylic acid, and anhydrides of said acids, and glycidyl esters of said acids:
wherein the olefin polymer is at least one selected from the group consisting of:
polyethylene;
polypropylene;
polybutene; copolymers comprising ethylene and at least one α-olefin having 3–12 carbon atoms; copolymers comprising ethylene, and α-olefin of 3–12 carbon atoms and a non-conjugated diene; and
copolymers comprising propylene and at least one α-olefin.

11. A multi-layer hose for automobile cooling systems according to claim 10, wherein the polymers which are modified so as to have a carboxyl group and/or its derivative group, is a polypropylene modified with maleic anhydride and/or a polyethylene modified with maleic anhydride.

12. A multi-layer hose for automobile cooling systems according to claim 4, wherein the amount of ethylenically unsaturated carboxylic monomer and/or its derivative monomer is 0.1–10% by weight based on the total weight of the polymer.

13. A multi-layer hose for automobile cooling systems according to claim 2, wherein the polymer containing a carboxyl group and/or its derivative group in the molecule is:

(A) a polymer modified so as to have a carboxyl group and/or its derivative group as a copolymer component; or (B) a polymer containing an ethylenically unsaturated carboxylic acid and/or its derivative as a copolymer component,
and wherein said polymer containing a carboxyl group and/or its derivative group in the molecule is a copolymer of ethylene or propylene with acrylic acid, methacrylic acid, crotonic acid, maleic acid, halogenated maleic acid, fumaric acid, itaconic acid, cis-4-cyclohexene-1,2-dicarboxylic acid, endo-cis-bicyclo(2,2,1)-5-heptene-2,3-dicarboxylic acid, acrylic acid anhydride, methacrylic acid anhydride and crotonic acid anhydride, maleic acid anhydride, halogenated maleic acid anhydride, fumaric acid anhydride, itaconic acid anhydride, cis-4-cyclohexene-1,2-dicarboxylic acid anhydride, endo-cis-bicyclo(2,2,1)-5-heptene-2,3-dicarboxylic acid anhydride, acrylamide, methacrylamide, glycidyl acrylate and glycidyl methacrylate.

14. A multi-layer hose for automobile cooling systems according to claim 13, wherein the copolymers are selected from the group consisting of ethylene-maleic anhydride copolymer, ethylene-acrylic acid copolymer, and ethylene-methacrylic acid copolymer.

15. A multi-layer hose for automobile cooling systems to claim 2, wherein the polymer containing a carboxyl group and/or its derivative group in the molecule is:

1) a polymer modified so as to have a carboxyl group and/or its derivative group as a graft component; or 2) a polymer containing an ethylenically unsaturated carboxylic acid and/or its derivative as a graft component,
wherein the polymer is an olefin polymer, which is at least one selected from the group consisting of:
polyethylene;
polypropylene;
polybutene;
copolymers comprising ethylene and at least one α-olefin of 3–12 carbon atoms; copolymers comprising ethylene, an α-olefin of 3–12 carbon atoms and a non-conjugated diene; and
copolymers comprising propylene and at least one α-olefin;
wherein said olefin polymer is grafted with at least one selected from the group consisting of acrylic acid, methacrylic acid and glycidyl methacrylate.

16. A multi-layer hose for automobile cooling systems according to claim 1, wherein the ethylene-β-olefin copolymer produced with a metallocene catalyst comprises ethylene and an α-olefin selected from the group consisting of propylene, butene-1, pentene-1, hexene-1, 4-methylpentene-1, heptene-1, octene-1, nonene-1, decene-1, undecene-1 and dodecene-1; and the copolymer may further comprise a non-conjugated diene selected from the group consisting of ethylidenenorbornene and dicyclopentadiene.

17. A multi-layer hose for automobile cooling systems according to claim 1, wherein the metallocene catalyst comprises titanium or zirconium.

18. A multi-layer hose for automobile cooling systems according to claim 1, wherein the propylene resin is at least one selected from the group consisting of isotactic or syndiotactic polypropylene homopolymers and isotactic or syndiotactic propylene copolymers of propylene with α-olefins selected from the group consisting of ethylene, butene-1, pentene-1 and hexane-1.

19. A multi-layer hose for automobile cooling systems according to claim 1, wherein the olefin thermoplastic elastomer is dynamically crosslinked with at least one selected from the group consisting of 1,2-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis (t-butylperoxy) hexyne-3.

20. A multi-layer hose for automobile cooling systems according to claim 19, wherein the thermoplastic elastomer is dynamically crosslinked with at least one crosslinking aid selected from the group consisting of triallyl isocyanurate, triallyl cyanurate, divinylbenzene, trimethylolpropane, trimethacrylate, trimethylolpropane triacrylate, ethylene glycol dimethacrylate, triethylene glycol dimethacrylate, diethylene glycol dimethacrylate, phenylmaleimide, allyl methacrylate, N,N'-m-phenylene-bismaleimide and 1,2-polybutadiene.

* * * * *